(12) United States Patent
Ding et al.

(10) Patent No.: US 12,106,253 B2
(45) Date of Patent: Oct. 1, 2024

(54) CONTAINER MANAGEMENT METHOD, APPARATUS, AND DEVICE

(71) Applicant: Huawei Technologies Co., Ltd., Shenzhen (CN)

(72) Inventors: Wenqiang Ding, Hangzhou (CN); Juan Li, Hangzhou (CN); Qishuai Xu, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 868 days.

(21) Appl. No.: 17/117,698

(22) Filed: Dec. 10, 2020

(65) Prior Publication Data
US 2021/0097476 A1 Apr. 1, 2021

Related U.S. Application Data

(63) Continuation of application No. PCT/CN2019/085509, filed on May 5, 2019.

(30) Foreign Application Priority Data

Jun. 29, 2018 (CN) .......................... 201810713108.3

(51) Int. Cl.
G06F 9/455 (2018.01)
G01N 21/90 (2006.01)
G06F 9/50 (2006.01)
G06Q 10/08 (2024.01)
G06F 3/0484 (2022.01)

(52) U.S. Cl.
CPC ............. *G06Q 10/08* (2013.01); *G01N 21/90* (2013.01); *G06F 9/455* (2013.01); *G06F 9/50* (2013.01); *G06F 3/0484* (2013.01)

(58) Field of Classification Search
CPC ...... G06Q 10/08; G01N 21/90; G06F 3/0484; G06F 9/455; G06F 9/50
See application file for complete search history.

(56) References Cited

U.S. PATENT DOCUMENTS

| 6,954,930 | B2 | 10/2005 | Drake et al. | |
| 2006/0218164 | A1* | 9/2006 | Shinmura | G06F 16/93 |
| 2013/0097275 | A1* | 4/2013 | Wofford, IV | G06F 3/0652 |
| | | | | 709/213 |
| 2013/0212485 | A1 | 8/2013 | Yankovich et al. | |
| 2016/0371108 | A1* | 12/2016 | Madtha | G06F 9/45558 |
| 2017/0177877 | A1 | 6/2017 | Suarez et al. | |
| 2018/0095973 | A1 | 4/2018 | Huang et al. | |

(Continued)

FOREIGN PATENT DOCUMENTS

| CN | 106487850 A | 3/2017 |
| CN | 106874357 A | 6/2017 |

(Continued)

*Primary Examiner* — Raqiul A Choudhury
(74) *Attorney, Agent, or Firm* — Slater Matsil, LLP

(57) ABSTRACT

This application discloses a container management method, apparatus, and device. The method includes: obtaining a provisioning request that carries an identifier of a first user and an identifier of a first container image; querying and obtaining the identifier of the first container image in a container image information database of the first user; obtaining the container image based on the identifier of the first container image; and provisioning a container based on the container image.

20 Claims, 9 Drawing Sheets

(56) References Cited

U.S. PATENT DOCUMENTS

| | | | | |
|---|---|---|---|---|
| 2018/0124055 A1* | 5/2018 | Chen | .................... | G06F 21/6218 |
| 2018/0225155 A1* | 8/2018 | Watt, Jr. | ................ | G06F 9/5083 |
| 2018/0349168 A1* | 12/2018 | Ahmed | ............... | G06F 11/3006 |
| 2019/0068706 A1* | 2/2019 | Chen | .................... | H04L 67/1097 |
| 2019/0146772 A1* | 5/2019 | Griffin | ...................... | G06F 8/71 |
| | | | | 717/121 |
| 2019/0205408 A1* | 7/2019 | Chen | .................... | G06F 11/3476 |
| 2019/0347121 A1 | 11/2019 | Luo et al. | | |

FOREIGN PATENT DOCUMENTS

| | | | |
|---|---|---|---|
| CN | 107229507 A | 10/2017 | |
| CN | 107643940 A | 1/2018 | |
| CN | 107819802 A | 3/2018 | |
| CN | 109656686 A | 4/2019 | |

\* cited by examiner

CONTAINER MANAGEMENT METHOD, APPARATUS, AND DEVICE

CROSS-REFERENCE TO RELATED APPLICATIONS

This application is a continuation of International Application No. PCT/CN2019/085509, filed on May 5, 2019, which claims priority to Chinese Patent Application No. 201810713108.3, filed on Jun. 29, 2018. The disclosures of the aforementioned applications are hereby incorporated by reference in their entireties.

TECHNICAL FIELD

This application relates to the field of computer technologies, and in particular, to a container management method, apparatus, and device.

BACKGROUND

A container technology is a lightweight virtualization technology used to share server resources. A container may provide a virtual execution environment for a process, and one virtual execution environment is one container. A container image is a read-only special file system that provides a program, a library, a resource, and a configuration required for running a container, and does not include any dynamic data. A container management system may distribute and run a container based on a container image, or convert a container into a container image and save the container image.

In the conventional technology, the container management system is loaded on a host. The container management system may provision a container for a user, and provide, on the host, storage space for storing a container image for the user. The user may customize the container image and store the container image in the storage space, and another user may download the container image and start the container.

However, when the container management system provisions the container, the user may not only obtain the container image stored by the user, but also obtain a container image stored by another user. This may result in leakage of user data and cause the security problem.

SUMMARY

This application provides a container management method, apparatus, and device, to overcome the security problem in the conventional technology.

According to a first aspect, this application provides a container management method, including: obtaining a container provisioning request, wherein the container provisioning request is a request used to provision a first container based on a first container image, and the container provisioning request carries an identifier of the first container image and an identifier of a first user; and querying a container image information database corresponding to the identifier of the first user. The container image information database is used to store a mapping relationship between the identifier of the first user and the first container image. Therefore, when the identifier of the first container image exists in the container image information database, the first container image is obtained based on the identifier of the first container image. In this way, the first container is provisioned based on the first container image. In a container provisioning process, the container image information database of the first user is queried, but a container image information database of another user is not queried. In this case, a container image of another user is not obtained. This implements user-level isolation of user data in the container provisioning process, and ensures security of the user data.

In a possible implementation, the container image information database is registered and created, and the identifier of the first user is further obtained during registration. The container image information database is used to store one or more identifiers of one or more container images associated with the identifier of the first user. If the first container image is one of the one or more container images associated with the identifier of the first user, the container image information database includes the identifier of the first container image. Registering and creating the container image information database can ensure a correspondence between the container image information database and the identifier of the first user, and further ensure the security of the user data of the first user because the container image information database of the first user cannot be obtained based on an identifier of the another user.

In another possible implementation, information about the first container image is obtained based on the identifier of the first container image. The information about the first container image may be included in the container image information database, or may be included in another information set. In addition, the information about the first container image can be obtained based on the identifier of the first container image. In this way, the first container image can be obtained based on the information about the first container image. In addition, the first container image may be stored in local storage space. This obtaining manner ensures the security of the user data.

In another possible implementation, when the identifier of the first container image that is carried in the container provisioning request is not included in the container image information database, the first container image may be further obtained from a container image repository based on an attribute of the first container image. When the attribute of the first container image is private, the container image repository is a private container image repository of the first user; or when the attribute of the first container image is public, the container image repository is a public container image repository. Storage locations of the private container image repository of the first user and the public container image repository may not be in the local storage space, for example, may be stored in a cloud. This facilitates centralized management of container images. In addition, the container images are separately stored based on attributes (public or private) of the container images to facilitate subsequent search and isolation. This further ensures the security of the user data.

In another possible implementation, the method may further include: generating a second container image based on the first container, where the second container image may be the same as or different from the first container image, and the second container image includes information about the first user, an application, and/or a driver; adding an identifier of the second container image to the container image information database, to be specific, associating the identifier of the second container image with the identifier of the first user in the container image information database; and uploading the second container image to the private container image repository of the first user, and to provision a container. This isolates different user data and ensures the security of the user data.

In another possible implementation, before the container image information database corresponding to the identifier of the first user is queried, an authentication result may be further obtained based on the identifier of the first user. When the authentication result is successful, an operation of querying the container image information database is performed. An authentication operation may further improve the security of the user data in the container management method by using a strict authentication algorithm.

According to a second aspect, this application provides a container management apparatus. The apparatus includes modules configured to perform the container management apparatus in any one of the first aspect or the possible implementations of the first aspect.

According to a third aspect, a container management device is provided. The apparatus includes a processor and a memory, the memory stores at least one instruction, and the processor loads and executes the instruction to implement any container management method described above.

According to a fourth aspect, a computer-readable storage medium is provided. The storage medium stores at least one instruction, and a processor loads and executes the instruction to implement any container management method described above.

According to a fifth aspect, a computer program product including an instruction is provided. When the computer program product runs on a computer, the computer is enabled to perform any container management method described above.

The technical solutions provided in this application include at least the following beneficial effects.

In this application, a container image information database corresponding to an identifier of a user is queried. After an identifier of a container image is found from the container image information database of the user, the container image is obtained based on the identifier of the container image, and a container is further provisioned based on the container image. In a container provisioning process, the container image information database of the user is queried, but a container image information database of another user is not queried. In this case, a container image of another user is not obtained. This implements user-level isolation of user data in the container provisioning process, and ensures security of the user data.

It should be understood that the foregoing general descriptions and the following detailed descriptions are only examples and explanatory, and do not limit this application.

DETAILED DESCRIPTION OF ILLUSTRATIVE EMBODIMENTS

To make objectives, technical solutions, and advantages of this application clearer, the following further describes implementations of the present application in detail with reference to accompanying drawings.

An application scenario of embodiments of the present application is first described before the embodiments of the present application are described in detail.

A container technology is a lightweight virtualization technology used to share server resources. The container technology may provide a virtual execution environment for a process, and one container provides one virtual execution environment. The virtual execution environment may be bound to a specific central processing unit (CPU) and a memory node, allocate a specific proportion of CPU time and a specific proportion of input/output (IO) time, limit available memory size, and provide device access control. Compared with a virtual machine, the container is more lightweight, easier to distribute, and has higher performance and lower losses.

A container image is a read-only special file system that provides a program, a library, a resource, and a configuration required for running a container, and does not include any dynamic data. The container image includes one or more of the following information: information about a user, an application, and a driver. The container image is a layered structure and includes a plurality of layers of read-only data. The plurality of layers include one or more of the following layers: a base image layer, an application program layer, a user-defined layer, and the like. A plurality of read-only layers may be integrated into one container image by using a union file system (UFS) technology.

The container is an instance created based on the container image. The instance is an object that includes a user configuration and a running configuration required for implementing a function of the container image. Provisioning the container based on the container image may be adding a read/write layer based on the read-only layers of the container image, and integrating the plurality of read-only layers and the read/write layer into one container by using a union mount (UM) technology. The container is classified into an application container and a system container based on different application scenarios. The application container is used to orchestrate and schedule a stateless application, and an application container image includes an application and a running environment configuration. The system container is used to orchestrate and schedule computing resources such as a CPU, a memory, and a storage resource. The system container has a full operating system (OS)

environment, supports a stateful application, and can provide dynamic resource allocation.

Figure 1:
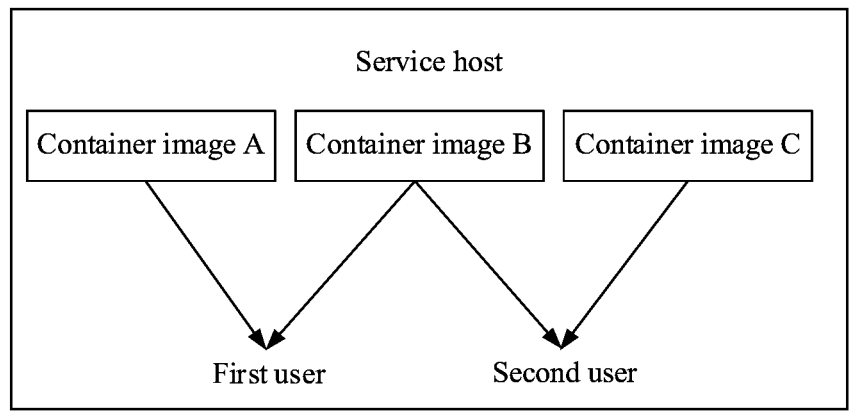
FIG. 1 is a schematic diagram of a storage form of a container image in a conventional technology.

In the conventional technology, a computing service system that provides a computing service generally includes a management host configured to manage the provided computing service and a service host that provides a specific computing service. In addition, the computing service system may further include a storage host, and the storage host is configured to store related data of the provided computing service. A container management system is installed on one service host, to provision a container running on the service host for a user, and provide local storage space for storing a container image for the user on the service host. The local storage space of the service host may store a plurality of container images of one or more users. Attributes of the container image may be public and private. A container image whose attribute is public is referred to as a public container image, and means that the container image is a container image open to all users. A container image whose attribute is private is referred to as a private container image, and means that the container image is a private container image of a user. The user may specify whether the private container image is open to all users. As shown in FIG. 1, a container image A and a container image B of a first user, and the container image B and a container image C of a second user are stored on a service host. The container image B is a public container image, the container image A is a private container image of the first user, and the container image C is a private container image of the second user. Storage of the container image A, the container image B, and the container image C on the service host is not isolated at a user level. When the first user provisions a container by using a container management system, the container images of the first user and the container images of the second user, namely, the container image A, the container image B, and the container image C, may be obtained from local storage space of the service host. The container may be provisioned based on the container image A, the container image B, or the container image C. When the second user provisions a container by using the container management system, a case is similar to that of the first user, and details are not described herein. It can be learned that the conventional container management system cannot implement isolation of container images of different users on the service host. This is not conducive to protecting security of user data.

To protect the security of the user data, the present application provides a container management solution, to implement user-level isolation of user data in a container provisioning process. The container management solution may provide a container management solution for a user based on an infrastructure as a service (IaaS), and the IaaS may provide a computing service, for example, a cloud computing service, based on a complete computer infrastructure.

Figure 2:
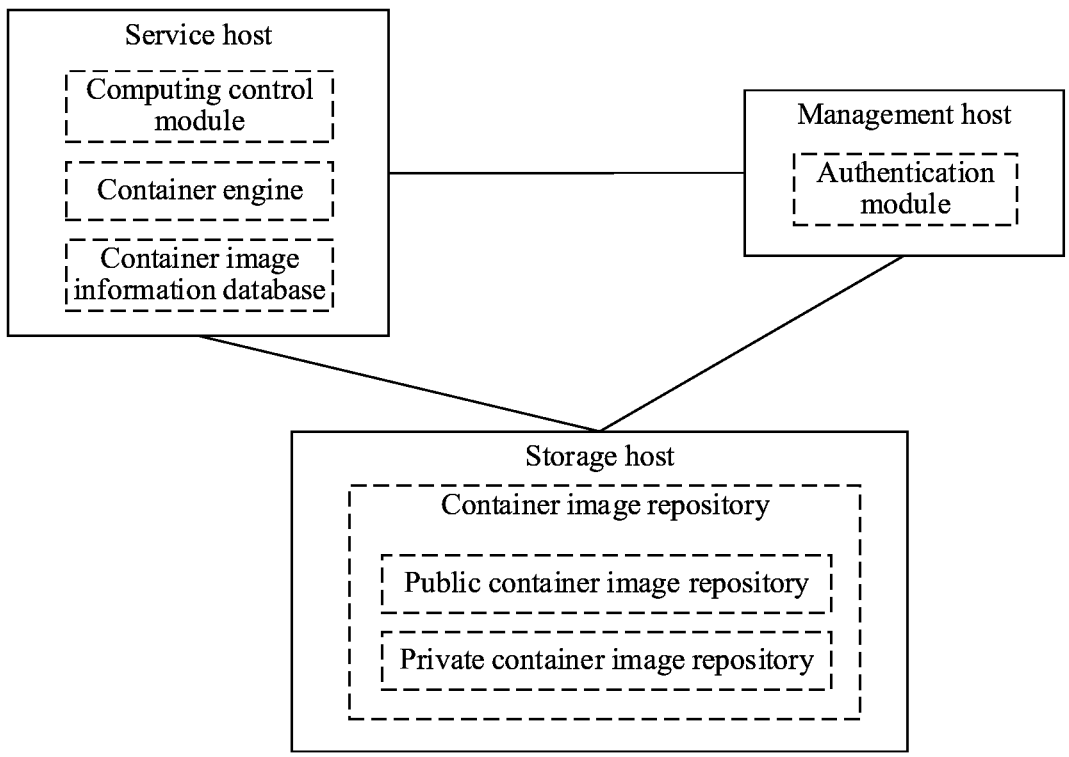
FIG. 2 is an architectural diagram of a system in a container management method according to an embodiment of the present application.

FIG. 2 shows a system architecture of a cloud service management system according to an embodiment of the present application. The system architecture includes a service host, a management host, and a storage host. The service host is configured to provide a specific cloud computing service, the management host is configured to manage the provided cloud computing service, and the storage host is configured to store related data of the provided cloud computing service.

It should be noted that the service host, the management host, and the storage host may be a same physical host or virtual host, or may be different physical hosts or virtual hosts. The physical host or the virtual host may be a host in an IaaS computing resource pool.

Further, a container management system runs in the cloud service management system, and the container management system includes at least a container engine and a container image repository. The system architecture shown in FIG. 2 is used as an example. At least a computing control module of the cloud service management system, and the container engine and the container image repository of the container management system are deployed on the service host. At least an authentication module of the cloud service management system is deployed on the management host. At least the container image repository of the container management system is deployed on the storage host. The container image repository includes a public container image repository and a private container image repository. Optionally, in addition to the system shown in FIG. 2, the cloud service management system in this embodiment of the present application may include another service host on which the computing control module and the container engine are deployed. A deployment manner of modules of the container management system on the service host, the management host, and the storage host is not limited to the foregoing examples.

The computing control module is configured to deploy cloud computing, including instance running, network management, user control, and the like. The authentication module is a module used to manage identity authentication, a service rule, and a token function. The container engine is used for container-related management, container-related user management, and the like. The container image repository is used to store and distribute a container image, and includes the public container image repository and the private container image repository.

In addition to the container image repository deployed on the storage host and used to store a container image, local storage space of the service host stores one or more container images of a user, and the user is a user that registers with the container engine on the service host. The one or more container images may be downloaded from the public container image repository in the container image repository or a private container image repository of the user, or may be obtained by converting a container on the service host.

The container image information database includes an identifier of a container image associated with an identifier of the user in the local storage space of the service host. Information about the container image may be further obtained based on the identifier of the container image, and the information about the container image includes one or more of the following information: an attribute of the container image and storage location information of the container image, for example, storage index information. It should be noted that, the information about the container image may be included in the container image information database of the user, or may be stored in other information storage space or included in another information set. However, regardless of where the information is stored, the information may be found according to a mapping relationship between the identifier of the container image and the information about the container image. The identifier of the user may be an identification (ID) of the user and/or a token (token) of the user. The identifier of the container image may be an ID of the container image and/or a name of the container image. It should be noted that the user has a permission to query the container image information database of the user, but does not have a permission to query a container image information database of another user.

Figure 3:
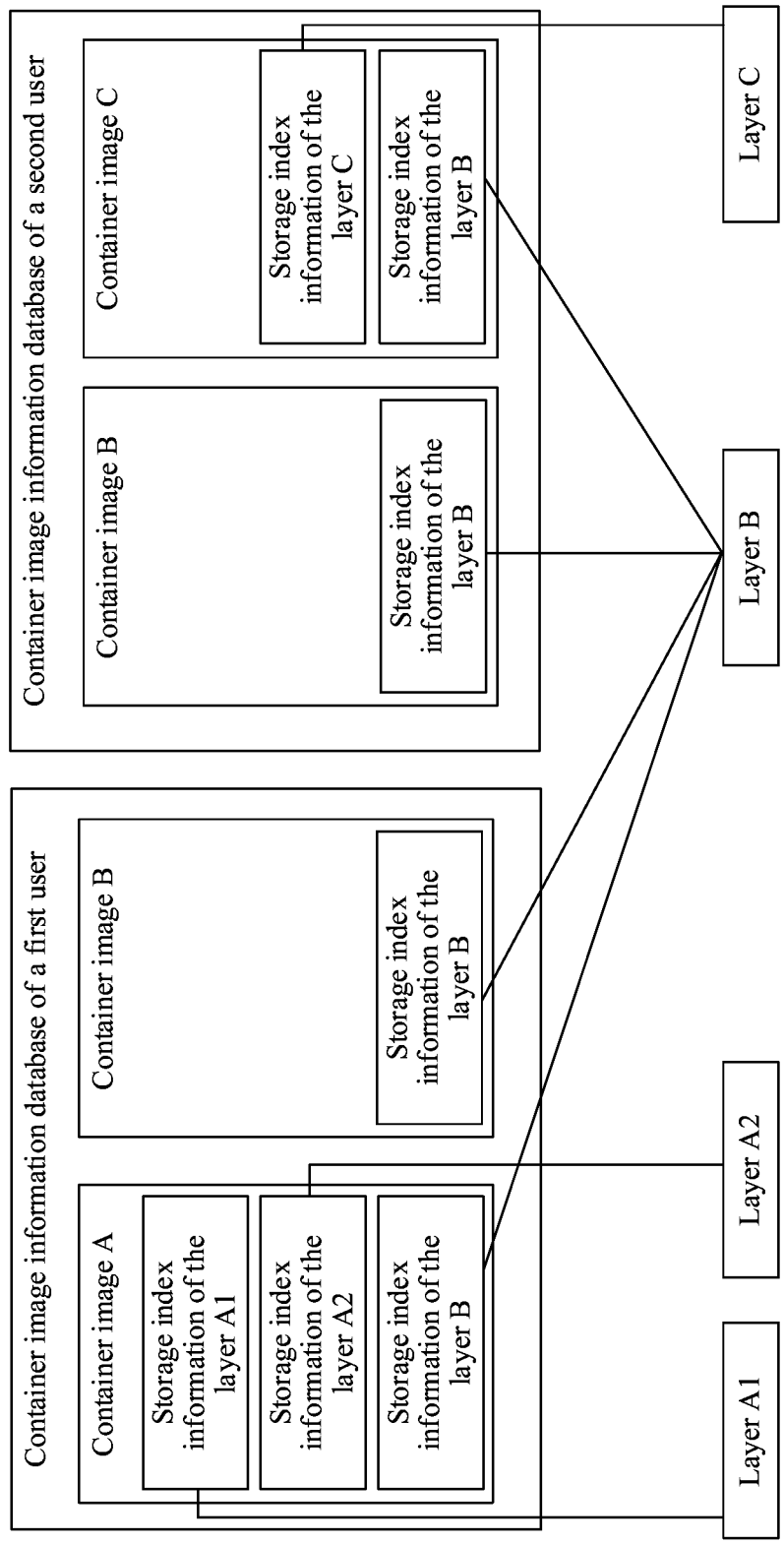
FIG. 3 is a schematic diagram of a container image information database in a container management method according to an embodiment of the present application.

FIG. 3 shows an example of a container image information database of a user. A container image information database of a first user includes an identifier of a container image A and an identifier of a container image B. A container image information database of a second user includes the identifier of the container image B and an identifier of a container image C. The container image B is a public container image, the container image A is a private container image of the first user, and the container image C is a private container image of the second user. The container image A includes a layer A1, a layer A2, and a layer B; the container image B includes the layer B; and the container image C includes the layer B and a layer C. For example, the layer A1 is a user-defined layer of the first user, the layer A2 is an application program layer of the first user, the layer B is a public base image layer, and the layer C is a user-defined layer of the second user. The container image information databases further include storage index information of the layer A1, the layer A2, and the layer B of the container image A, storage index information of the layer B of the container image B, and the storage index information of the layer B and storage index information of the layer C of the container image C.

In addition, the container image information database of the first user in a service host includes an identifier of a container image associated with an identifier of the first user, and the container image information database of the second user includes an identifier of a container image associated with an identifier of the second user. A user cannot query a container image information database of another user. To be specific, a user cannot obtain an identifier of a container image in a container image information database of another user. In this way, user-level isolation of user data can be implemented.

Figure 4:
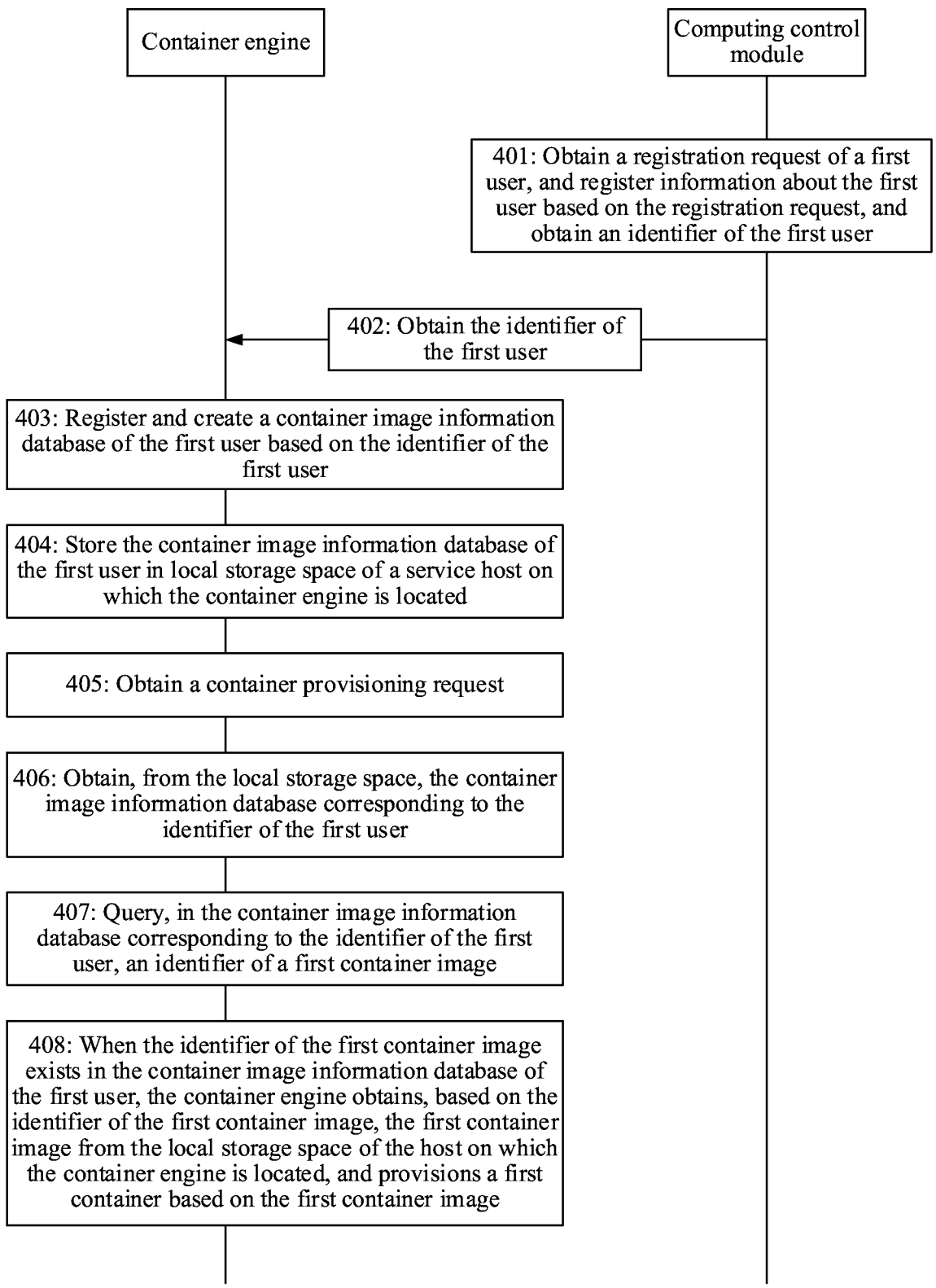
FIG. 4 is a flowchart of a container management method according to an embodiment of the present application.

The following describes a method embodiment of the present application by using an example of the system architecture shown in FIG. 2. FIG. 4 shows a flowchart of a container management method according to an embodiment of the present application. The method is used to manage a container provisioning process and includes the following steps.

Step 401: A computing control module obtains a registration request of a first user, and registers information about the first user based on the registration request, to obtain an identifier of the first user.

The registration request of the first user is obtained by using the computing control module in a service host. For example, a user interaction interface of the computing control module obtains the information about the first user, and generates the identifier of the first user based on the information about the first user.

Step 402: A container engine obtains the identifier of the first user from the computing control module.

Step 403: The container engine registers and creates a container image information database of the first user based on the identifier of the first user, where the container image information database includes one or more identifiers of one or more container images associated with the identifier of the first user.

For the container image information database of the first user, refer to the related descriptions in FIG. 2, and details are not described herein.

Step 404: The container engine stores the container image information database of the first user in local storage space of the service host on which the container engine is located.

It should be noted that step 401 to step 404 are a process of creating the container image information database. For container provisioning, the container image information database does not need to be re-created each time. Therefore, step 401 to step 404 are optional steps in a container provisioning process.

Step 405: The container engine obtains a container provisioning request, where the container provisioning request carries the identifier of the first user and an identifier of a first container image.

The identifier of the first container image is used to indicate the first container image required by a first container to be provisioned as requested by the container provisioning request. Optionally, the identifier of the first container image may be an ID of the first container image and/or a name of the first container image. The identifier of the first user is used for an operation such as an authentication operation or an operation of obtaining the container image repository of the first user in the container provisioning process. Optionally, the identifier of the first user may include an ID of the first user and/or a token of the first user.

In a possible implementation, step 405 includes:
obtaining, by the container engine, the container provisioning request of the user through the user interaction interface.

Optionally, the user interaction interface may alternatively be implemented by another component deployed on the service host or a management host. The container provisioning request is obtained through the user interaction interface, and is output to the container engine, so that the container engine obtains the container provisioning request.

Step 406: The container engine obtains, from the local storage space, the container image information database corresponding to the identifier of the first user.

Optionally, the container image information database of the first user one-to-one corresponds to the ID of the first user, and the container image information database corresponding to the identifier of the first user is a container image information database corresponding to the ID of the first user. The container engine may obtain the ID of the first user by using the computing control module deployed in the service host, and the ID of the first user is generated when the first user registers by using the computing control module.

In a possible implementation, the container image information database of the first user is stored, in a form of a data file, in the local storage space of the service host on which the container engine is located, and the container image information database includes the identifiers of the one or more container images associated with the ID of the first user.

To determine that the first user has a permission to perform a current operation, in an optional implementation, step 406 includes: obtaining, by the container engine, an authentication result based on the identifier of the first user; and when the authentication result is successful, querying, by the container engine, the container image information database corresponding to the identifier of the first user. The authentication operation may be an operation that the container engine authenticates the token of the first user based on user registration information in a container management system, or may be an operation that the container engine outputs the token of the first user to another authentication module for authentication through an interlace.

Step 407: The container engine queries the identifier of the first container image in the container image information data corresponding to the identifier of the first user.

In a possible implementation, step 407 includes:

querying, by the container engine based on the ID of the first user, the identifier of the first container image in the container image information database corresponding to the identifier of the first user. The identifier of the first container image may be used to obtain information about the first container image. The information about the first container image may include one or more identifiers of one or more read-only layers included in the first container image, and storage index information of the one or more read-only layers, where the storage index information is used to obtain the read-only layer from the local storage space. The information about the first container image may be included in the container image information database of the first user, or may be stored in another information storage space or may be included in another information set.

When the identifier of the first container image exists in the container image information database, step 408 is performed. When the identifier of the first container image does not exist in the container image information database, the container engine may further obtain the first container image from the container image repository. In an optional implementation, the method further includes:

when the identifier of the first container image does not exist in the container image information database and an attribute of the first container image is private, obtaining, by the container engine, the first container image from a private container image repository of the first user; or when the identifier of the first container image does not exist in the container image information database and an attribute of the first container image is public, obtaining, by the container engine, the first container image from a public container image repository.

The private container image repository of the first user and the public container image repository may be deployed on the service host or another host, and the container engine may obtain the first container image from the private container image repository of the first user or the public container image repository through a local interface or a remote interface.

For the attribute of the first container image, refer to the related descriptions in FIG. 2, and details are not described herein.

Optionally, the attribute of the first container image is found from the management host by the container engine based on the identifier of the first container image.

Step 408: When the identifier of the first container image exists in the container image information database of the first user, the container engine obtains, based on the identifier of the first container image, the first container image from the local storage space of the host on which the container engine is located, and provisions a first container based on the first container image.

In a possible implementation, when the identifier of the first container image exists in the container image information database of the first user, step 408 includes:

obtaining, by the container engine, the information about the first container image based on the identifier of the first container image; and obtaining, by the container engine, the first container image from the local storage space based on the information about the first container image, and starting, by the container engine, the first container based on the first container image. For example, the container engine obtains, from the local storage space based on the information about the first container image, the one or more read-only layers included in the first container image. The container engine integrates, by using a UM technology, the one or more read-only layers and a read/write layer required by a to-be-provisioned first container into the first container, and provisions the first container.

According to the method provided in the present application, a container image information database corresponding to an identifier of a user is queried. After an identifier of a container image is found from the container image information database of the user, the container image is obtained based on the identifier of the container image, and a container is further provisioned based on the container image. In a container provisioning process, only the container image information database of the user is queried, but a container image information database of another user is not queried. In this case, a container image of another user is not obtained. This implements user-level isolation of user data in the container provisioning process, and ensures security of the user data.

Figure 5:
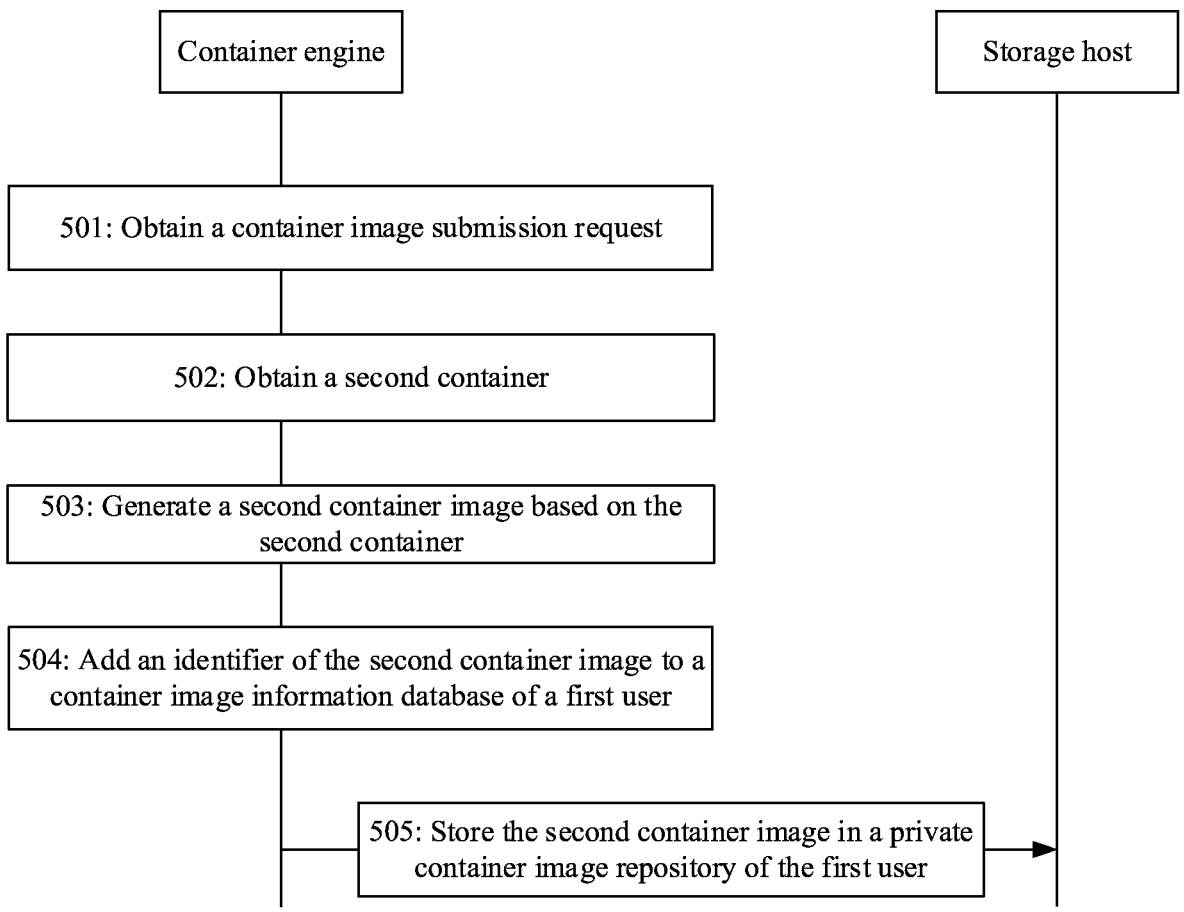
FIG. 5 is a flowchart of a container management method according to an embodiment of the present application.

Based on the foregoing embodiment, in an optional implementation, the container management method may be further used to manage a container image submission process. FIG. 5 shows a flowchart of a container management method according to an embodiment of the present application. The method is used to manage a container image submission process and includes the following steps.

Step 501: A container engine obtains a container image submission request, where the container image submission request is used to request to convert a second container into a second container image and submit the second container image.

The second container is a container instance of a first user in a service host, and the container image submission request carries an identifier of the first user and an identifier of the second container. Optionally, the identifier of the second container may be an ID of the second container and/or a name of the second container. The identifier of the first user is used for an operation such as an authentication operation or an operation of obtaining a container image repository of the first user in a container image submission process. Optionally, the identifier of the first user may include an ID of the first user and/or a token of the first user.

The container image submission request may be a container image submission request obtained by the container engine through a user interaction interface and sent by a user. Optionally, the user interaction interface may alternatively be implemented by another component deployed on the service host or a management host. The component obtains the container image submission request through the user interaction interface, and outputs the container image submission request to the container engine, so that the container engine obtains the container image submission request.

Step 502: The container engine obtains the second container, where the second container is stored in local storage space of the host on which the container engine is located.

Step 503: The container engine generates the second container image based on the second container.

In a possible implementation, step 503 includes:

separately reading, by the container engine, read-only layers included in the second container and loading the read-only layers layer by layer to obtain the second container image.

To determine that the first user has a permission to perform a current operation, the container image submission request further includes the token of the first user. In an optional implementation, step 503 includes obtaining, by the container engine, an authentication result based on the token of the first user; and if the authentication result is successful, generating, by the container engine, the second container image based on the second container.

For the authentication operation, refer to the related descriptions in step 406, and details are not described herein.

Step 504: The container engine adds an identifier of the second container image to a container image information database of the first user.

In an optical implementation, step 504 includes:

storing the container image information database of the first user in the service host, and obtaining, by the container engine from the service host, the container image information database of the first user based on the ID of the first user; and storing, by the container engine, the second container image in the local storage space of the service host, adding the identifier of the second container image to the container image information database of the first user, and associating information about the second container image with the identifier of the first user.

To determine that the first user has a permission to perform a current operation, in an optical implementation, step 504 includes:

obtaining, by the container engine, the authentication result based on the identifier of the first user. For the authentication operation, refer to the related descriptions in step 406, and details are not described herein.

If the authentication result is successful, the identifier of the second container image is added to the container image information database of the first user, and this adding operation may be implemented by the container engine, or may be implemented by the another component deployed on the management host.

Performing authentication based on the identifier of the first user may be that the container engine performs authentication based on the token of the first user included in the identifier of the first user.

Optionally, the method further includes step 505 in which the container engine uploads the second container image to a private container image repository of the first user. For example, the container engine stores the second container image into the private container image repository of the first user through a local interface or a remote interface. For example, the container engine stores the second container image into a private container image repository of a first user on a storage host through the local interface or the remote interface.

In this embodiment of the present application, a container of a user is converted into a container image, and an identifier of the container image is added to a container image information database of the user. In this case, the container image information database of the user includes the identifier of the container image of the user. The container image of the user in the storage space of the service host can be obtained, but a container image of another user cannot be obtained. This implements user-level isolation of user data, and ensures security of the user data.

Figure 6:
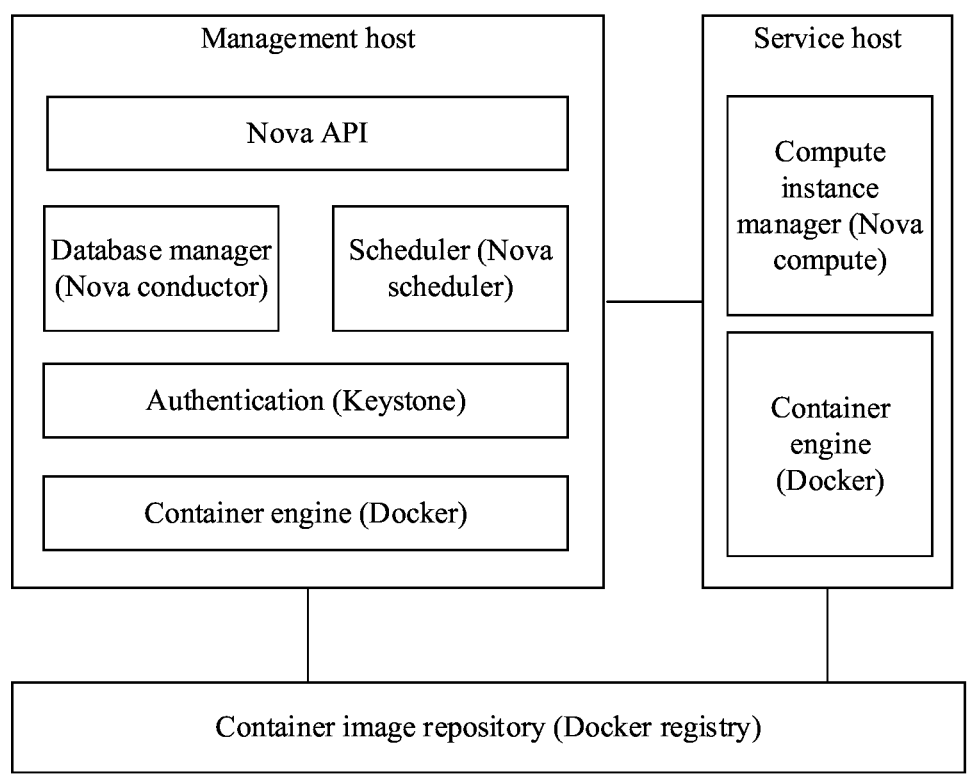
FIG. 6 is an architectural diagram of a system in a container management method according to an embodiment of the present application.

In a possible implementation, the cloud service management system may be OpenStack, and the container management system may be a Docker container management system. FIG. 6 shows a system architecture diagram of an OpenStack-based Docker container management system. As shown in FIG. 6, OpenStack includes at least Nova, Keystone (authentication module), and Glance (an image service component of OpenStack). Nova includes Nova API (interface), Nova conductor, Nova scheduler (scheduler), and Nova compute (compute). The Docker container management system includes at least Docker and Docker registry (repository). Nova compute and Docker are deployed on a service host, Nova API, Nova conductor, Nova scheduler, Keystone, and Glance are deployed on a management host, and Docker registry is deployed on the service host, the management host, or a storage host. It should be noted that the service host, the management host, and the storage host may be a same physical host or virtual host, and deployment manners of the preceding components on the service host, the management host, and the storage host are not limited to the preceding examples.

In the OpenStack-based Docker container management system shown in FIG. 6, functions of components are as follows:

Nova is used to dock a Docker-related interface to implement container management on the service host, and a function of Nova is similar to that of the cloud service management system.

Keystone is an authentication module and is used to dock the Docker-related interface to authenticate an identifier of a user.

Glance is used to dock the Docker-related interface to manage user information and information about a container image. The information about the container image includes but is not limited to the following information: an identifier of the container image and an attribute of the container image.

Docker is used to implement user management and container management on the service host, and a function of Docker is similar to that of the preceding container engine.

Docker registry is used for storage and distribution of the container image, and includes a public registry and a private registry. The public registry stores a public container image, and the private registry stores a private container image of a user. A function of Docker registry is similar to that of the preceding container image repository.

In addition, Docker may further include one or more of the following interfaces.

A Docker authentication interface is used to authenticate the identifier of the user. An authentication result is used to determine whether the user has a permission to perform a current operation. If the authentication result is successful, the user has the permission to perform the current operation. If the authentication result is failed, the user does not have the permission to perform the current operation. Optionally, the Docker authentication interface may be used as a proxy for another authentication module, and provides an interface for the another authentication module to implement an authentication operation. For example, the Docker authentication interface may be used as a proxy for Keystone of OpenStack, output the identifier of the user to Keystone through a relevant interface, and obtain and output an authentication result of the identifier of the user provided by Keystone, to authenticate the identifier of the user. Optionally, the identifier of the user includes a token of the user. Optionally, the Docker authentication interface may be added to Docker in a form of a plug-in.

A Docker user management interface is used to implement functions such as registration, deregistration, and query of a user. The user may further register and create a container image information database of the user in Docker through the Docker user management interface, or deregister and delete a container image information database of the user. Optionally, a function implementation of the Docker user management interface may include: outputting related information about a registration request, a deregistration request, or a query request of the user to Keystone through the Docker user management interface, and obtaining and outputting a result of the registration request, the deregistration request, or the query request performed by Keystone on the user. Optionally, the Docker user management interface may further output a registration result, a deregistration result, or a query result through a user interaction interlace.

A Docker pull interface is used to download a container image from the private registry or the public registry based on a user requirement, and a process is as follows: The identifier of the user is authenticated through the Docker authentication interlace. If authentication is pass and the container image information database does not include the information about the container image, the container image is downloaded from the private registry or the public registry to local storage space of the service host. In addition, the Docker pull interlace may further add the information about the container image to the container image information database of the user.

A Docker commit interface is used to convert a container of the user to a private container image of the user, and a process is as follows: The identifier of the user is authenticated through the Docker authentication interface. If the authentication result is successful and the container image information database of the user exists on the service host, the container is converted into a container image and information about the container image is added to the container image information database of the user. In addition, the Docker commit interface may further save the converted container image in the local storage space of the service host.

A Docker container instance creation interface is used to create a container based on a user requirement, and a process is as follows: The identifier of the user is authenticated through the Docker authentication interface. If the authentication result is successful, it is determined whether the container image information database of the user exists on the service host. If the container image information database of the user exists, the required information about the container image is queried in the container image information database of the user. If the container image information database of the user includes the information about the container image, the container image is obtained based on the information about the container image. If the container image information database of the user does not include the information about the container image, the Docker pull interlace is invoked to download the container image from the private registry or the public registry to the service host. The container is created based on the container image. Alternatively, the information about the downloaded container image is added to the container image information database of the user, the information about the container image is obtained by using the container image information database of the user, the container image is obtained based on the information about the container image, and the container is created based on the container image.

A Docker push interface is used to upload a local container image to the private registry or the public registry, and a process is as follows: The identifier of the user is authenticated through the Docker authentication interface. If the authentication result is successful, the information about the container image is queried in the container image information database of the user. If the container image information database of the user includes the information about the container image, the container image is uploaded to the private registry or the public registry of the user.

A Docker container image information query interface is used to query, based on a user requirement, the information about the container image associated with the identifier of the user. Optionally, the Docker container image information query interface may query the information about the container image included in the container image information database of the user. Optionally, the Docker container image information query interface invokes Glance to query the information about the container image included in the private registry of the user. Optionally, the information about the container image is the identifier of the container image. Optionally, the Docker container image information query interface may further output the query result through the user interaction interlace.

In the OpenStack-based Docker container management system, one or more of the following container-related operations may be implemented:

container provisioning or deletion, container starting, container image management, and the like, where the container image management includes container image submission, container image downloading, container image viewing, and the like.

Figure 7A:
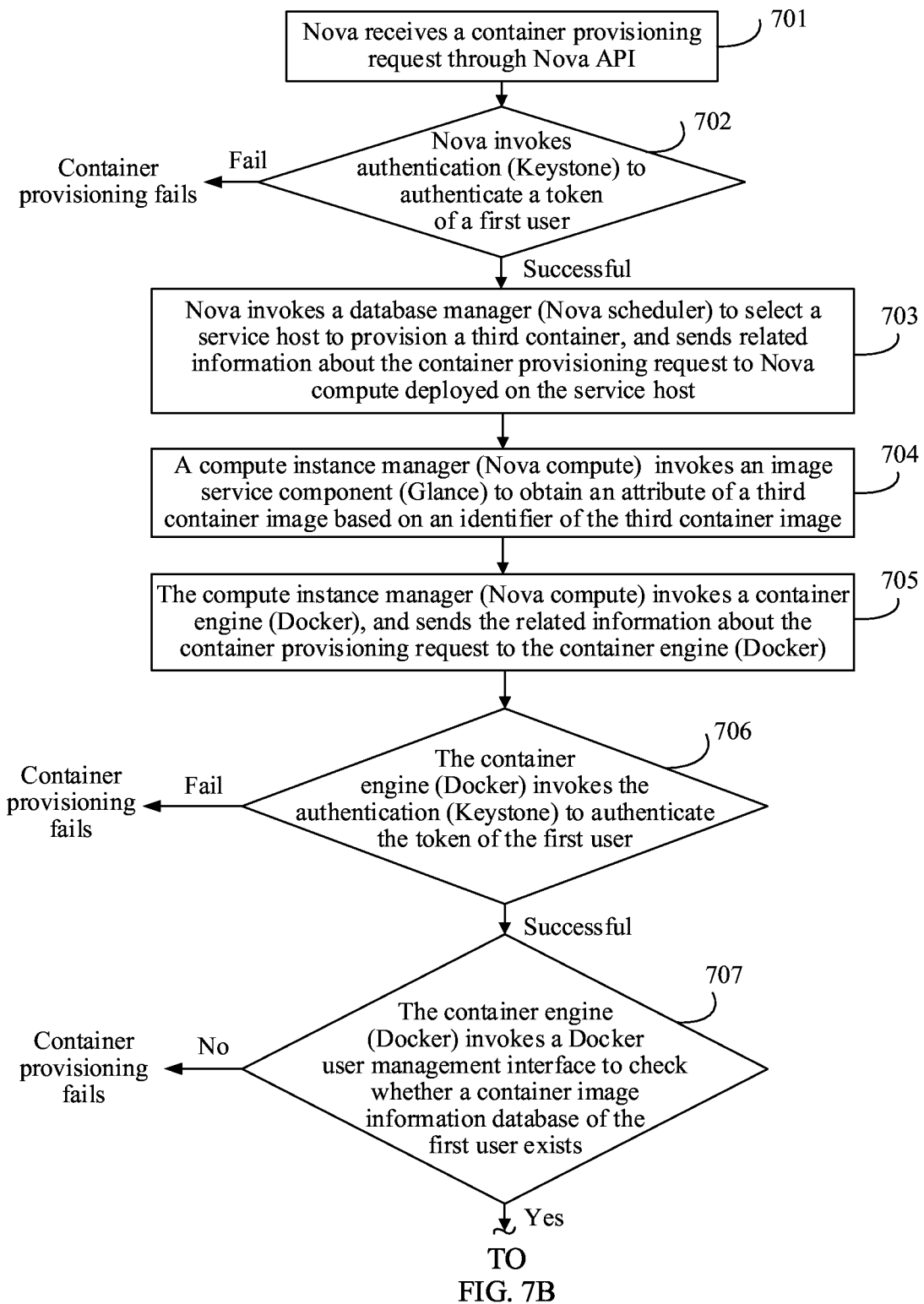
FIG. 7A and FIG. 7B are a flowchart of a container management method according to an embodiment of the present application.
Figure 7B:
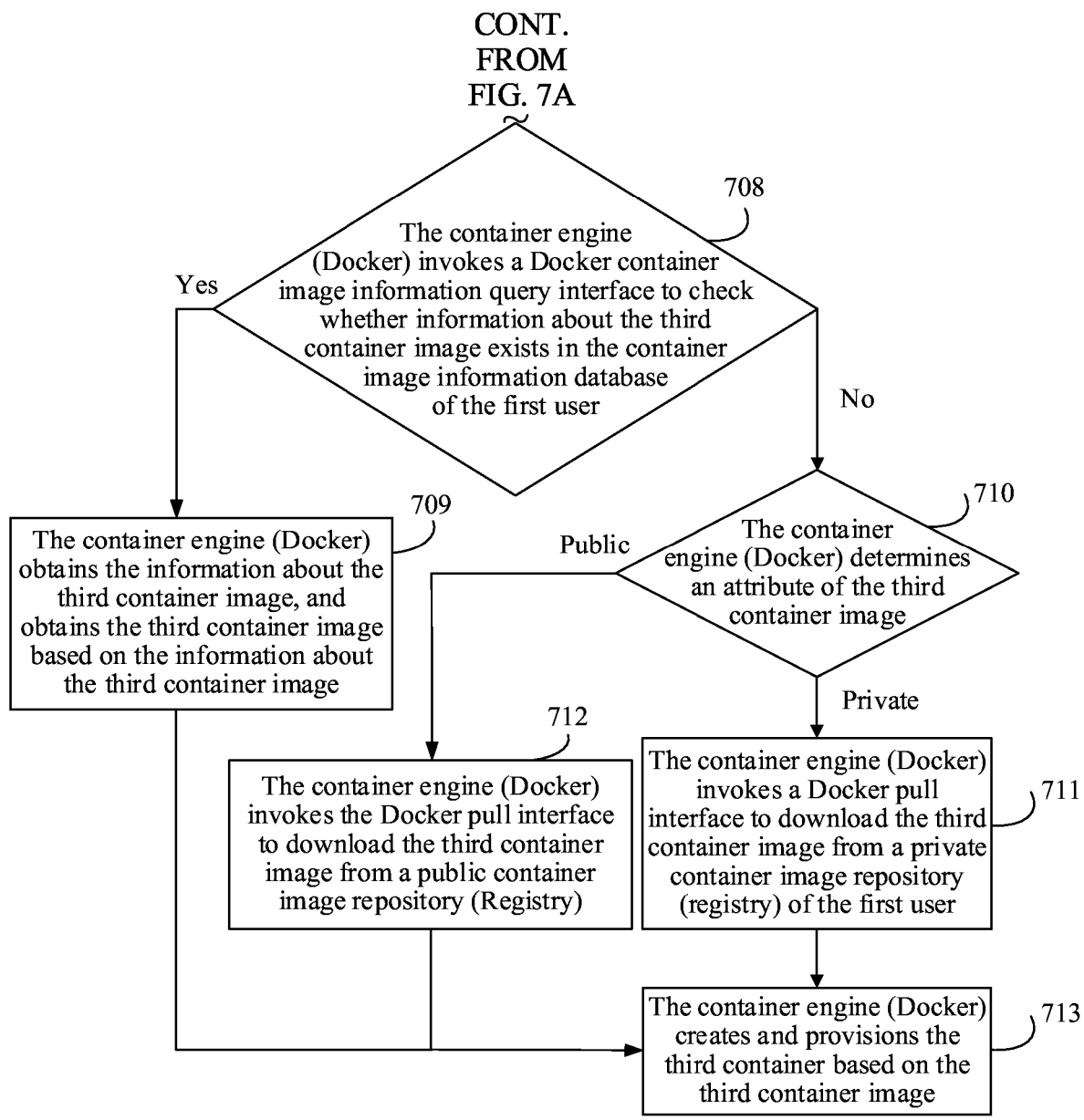

FIG. 7A and FIG. 7B show a flowchart of a container management method according to the present application. Using an example in which the method is used to provision a container in the OpenStack-based Docker container management system shown in FIG. 6, the method includes the following steps.

Step 701: Nova receives a container provisioning request through Nova API.

The container provisioning request is used to request to provision a third container. The container provisioning request includes at least an identifier of a first user initiating the container provisioning request and an identifier of a third container image, and the third container image is a container image required for provisioning the third container.

Optionally, the identifier of the first user may include an ID of the first user and/or a token of the first user, and the identifier of the third container image is an ID of the third container image and/or a name of the third container image.

Step 702: Nova invokes Keystone to authenticate the token of the first user. If an authentication result is successful, step 703 is performed.

Optionally, step 702 further includes: if the authentication result is failed, failing to provision the container.

Step 703: Nova invokes Nova scheduler to select a service host for provisioning the third container, and sends related information of the container provisioning request to Nova compute deployed on the service host.

Step 704: Nova compute invokes Glance to obtain an attribute of the third container image based on the identifier of the third container image.

Nova compute is deployed on the service host, and the attribute of the third container image is public or private.

Optionally, step 704 may further include: invoking, by Nova compute, Glance to obtain the name of the third container image based on the ID of the third container image.

Step 705: Nova compute invokes Docker, and sends the related information about the container provisioning request to Docker.

The related information of the container provisioning request includes but is not limited to the container provisioning request, the identifier of the first user, and the identifier of the third container image.

Step 706: Docker invokes Keystone to authenticate the token of the first user. If the authentication result is successful, step 707 is performed. If the authentication result is failed, the container fails to be provisioned.

Step 707: Docker invokes a Docker user management interface to check whether a container image information database of the first user exists. If the container image information database of the first user exists, step 708 is performed. If the container image information database of the first user does not exist, the container fails to be provisioned.

In an optional implementation, step 707 further includes: if the container image information database of the first user does not exist, failing to provision the container; feeding back, through Nova API, information that the container image information database of the first user does not exist to the first user; and triggering, by the first user, based on a feedback result of Nova API, to establish the container image information database of the first user. For an operation of establishing the container image information database of the first user, refer to step 501.

Step 708: Docker invokes a Docker container image information query interface to check whether information about the third container image exists in the container image information database of the first user. If the information about the third container image exists, step 709 is performed. If the information about the third container image does not exist, step 710 is performed.

Step 709: Docker obtains the information about the third container image and obtains the third container image based on the information about the third container image, and performs step 713.

Step 710: Docker determines the attribute of the third container image. If the attribute of the third container image is public, step 711 is performed. If the attribute of the third container image is private, step 712 is performed.

Step 711: Docker invokes a Docker pull interface to download the third container image from a public registry, and performs step 713.

Step 712: Docker invokes the Docker pull interface to download the third container image from a private registry of the first user, and performs step 713.

Step 713: Docker creates and provisions the third container based on the third container image.

In a possible implementation, steps 706 to 713 are implemented by invoking a Docker container instance creation interface by Docker.

In the present application, a container image information database corresponding to an identifier of a user is queried. After an identifier of a container image is found from the container image information database of the user, the container image is obtained based on the identifier of the container image, and a container is further provisioned based on the container image. In a container provisioning process, the container image information database of the user is queried, but a container image information database of another user is not queried. In this case, a container image of the another user is not obtained. This implements user-level isolation of user data in the container provisioning process, and ensures security of the user data.

In addition, an instruction, information, and/or data are/is sent to each module in an OpenStack system through a Docker interface in Docker, and functions such as user registration and user authentication in the OpenStack system may be used, to ensure the security of the user data in the Docker container management system.

Figure 8:
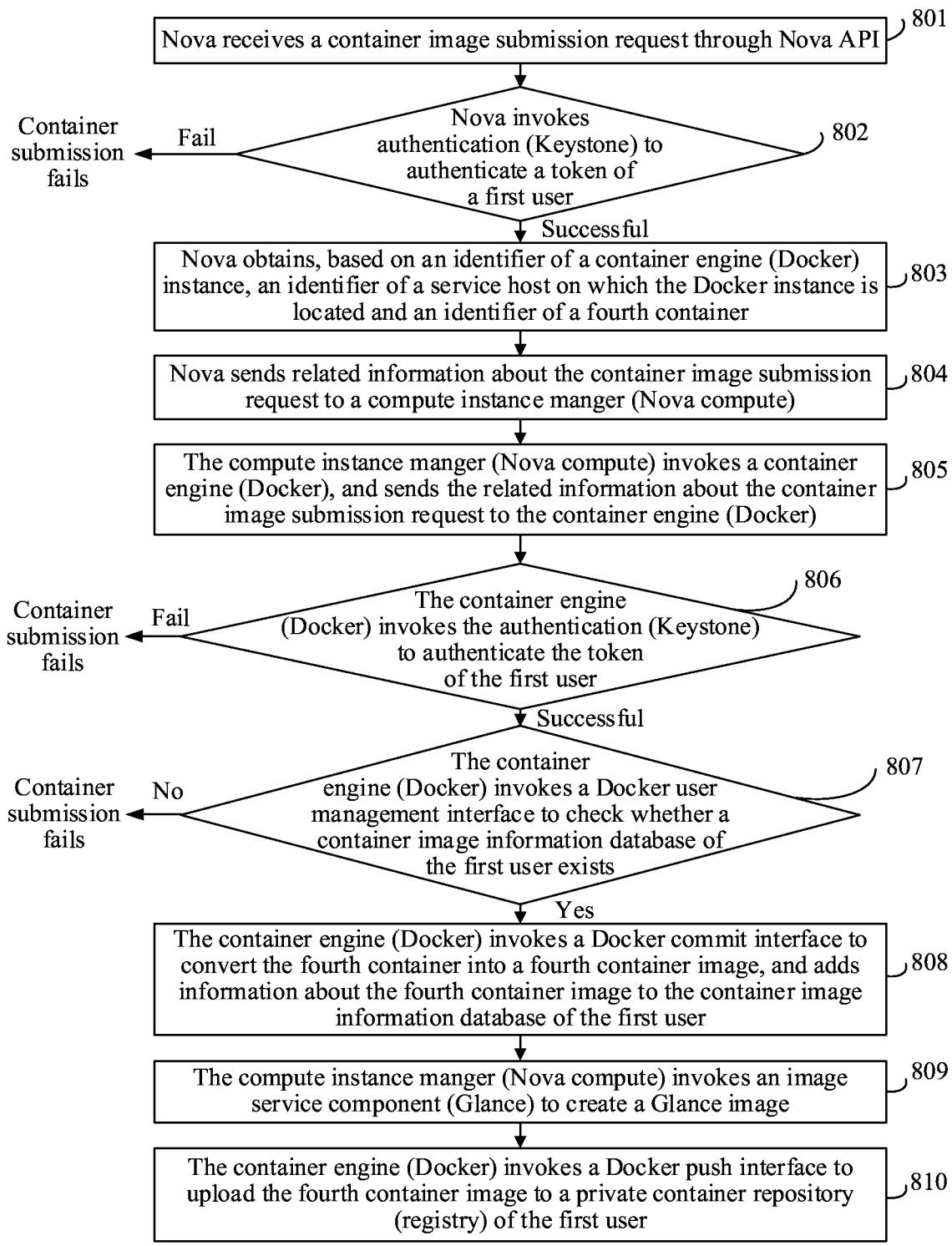
FIG. 8 is a flowchart of a container management method according to an embodiment of the present application.

FIG. 8 shows a flowchart of a container management method according to the present application. Using an example in which the method is used to manage a container image submission process in the OpenStack-based container management system shown in FIG. 6, the method includes the following steps.

Step 801: Nova receives a container image submission request through Nova API.

The container image submission request is used to request to convert a fourth container into a fourth container image and submit the fourth container image.

A container image submission request includes:

an identifier of a first user initiating the container image submission request and an identifier of a Docker container instance, where the identifier of the first user includes an ID of the first user and/or a token of the first user, and the identifier of the Docker container instance is an identifier of the Docker container instance in which the fourth container is located.

Step 802: Nova invokes Keystone to authenticate the token of the first user. If an authentication result is successful, step 803 is performed.

If the authentication result is failed, container image submission fails.

Step 803: Nova obtains, based on the identifier of the Docker container instance, an identifier of a service host on which the Docker container instance is located and an identifier of the fourth container.

Step 804: Nova sends related information about the container image submission request to Nova compute.

The related information about the container image submission request includes but is not limited to the container image submission request, the identifier of the first user, and the identifier of the fourth container.

Nova compute is deployed on the service host.

Step 805: Nova compute invokes Docker, and sends the related information of the container image submission request to Docker.

Step 806: Docker invokes Keystone to authenticate the token of the first user. If the authentication result is successful, step 807 is performed. If the authentication result is failed, container image submission fails.

Step 807: Docker invokes a Docker user management interface to check whether a container image information database of the first user exists. If the container image information database of the first user exists, step 808 is performed. If the container image information database of the first user does not exist, container image submission fails.

Step 808: Docker invokes a Docker commit interface to convert the fourth container into the fourth container image, and adds information about the fourth container image to the container image information database of the first user.

Step 809: Nova compute invokes Glance to create a Glance image.

The Glance image is an image of the fourth container image in Glance, so that Nova can use the Glance image for container provisioning on another service host.

Optionally, step 809 further includes: establishing a mapping relationship between an identifier of the Glance image and a name of the fourth container image.

Step 810: Docker invokes a Docker push interlace to upload the fourth container image to a private registry of the first user.

Optionally, step 810 includes: invoking the Docker push interface by Docker; invoking the Docker user management interface by the Docker push interface, to output the token of the first user to Keystone for authentication; and if the authentication result is successful, uploading the fourth container image to the private registry of the first user.

In this embodiment of the present application, a container of a user is converted into a container image, and an identifier of the container image is added to a container image information database of the user. In this case, the container image information database of the user includes the identifier of the container image of the user. The container image of the user in storage space of the service host can be obtained, but a container image of another user cannot be obtained. This implements user-level isolation of user data is implemented, and ensures security of the user data.

In addition, an instruction, information, and/or data are/is sent to each module in an OpenStack system through a Docker interface in Docker, and functions such as user registration and user authentication in the OpenStack system may be used, to ensure the security of the user data in the Docker container management system.

The foregoing describes in detail the container management methods provided in the embodiments of the present application with reference to FIG. 1 to FIG. 8. The following describes a container management apparatus and device provided in embodiments of the present application.

Figure 9:
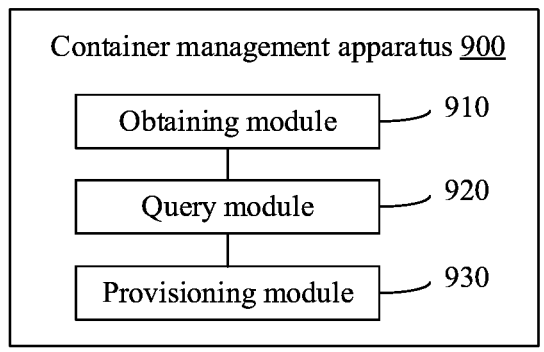
FIG. 9 is a structural block diagram of a container management apparatus according to an embodiment of the present application.

FIG. 9 shows a block diagram of a container management apparatus 900 according to the present application. The container management apparatus 900 includes an obtaining module 910, a query module 920, and a provisioning module 930.

The obtaining module 910 is configured to obtain a container provisioning request.

The container provisioning request carries an identifier of a first user and an identifier of a first container image.

The query module 920 is configured to query a container image information database corresponding to the identifier of the first user, where the container image information database is used to store a mapping relationship between the identifier of the first user and the first container image.

The provisioning module 930 is configured to: when the identifier of the first container image exists in the container image information database, obtain the first container image based on the identifier of the first container image, and provision a first container based on the first container image.

In an optional implementation, the provisioning module 930 is configured to: obtain information about the first container image based on the identifier of the first container image; and obtain the first container image from local storage space based on the information about the first container image, and start the first container based on the first container image.

In an optional implementation, the query module 920 is configured to: obtain an authentication result based on the identifier of the first user; and when the authentication result is successful, query the container image information database corresponding to the identifier of the first user.

In an optional implementation, the provisioning module 930 is further configured to: when the identifier of the first container image does not exist in the container image information database and an attribute of the first container image is private, obtain the first container image from a private container image repository of the first user; or when the identifier of the first container image does not exist in the container image information database and an attribute of the first container image is public, obtain the first container image from a public container image repository.

In an optional implementation, the container management apparatus 900 further includes:

a creation module, configured to register and create, based on the identifier of the first user, the container image information database corresponding to the identifier of the first user, where the container image information database includes one or more identifiers of one or more container images associated with the identifier of the first user.

Figure 10:
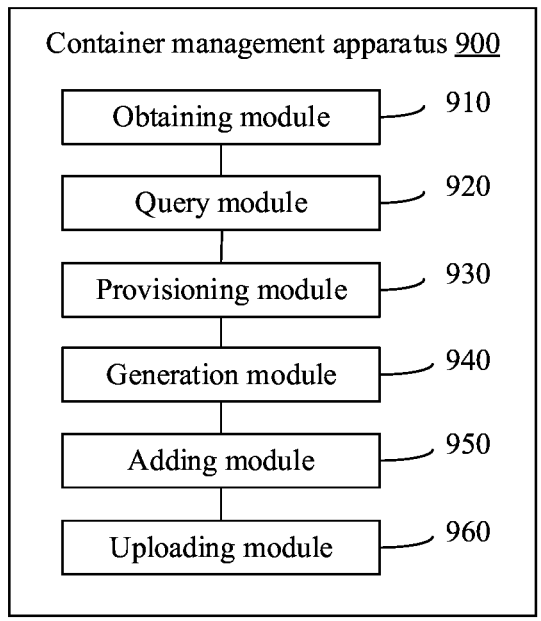
FIG. 10 is a structural block diagram of a container management apparatus according to an embodiment of the present application.

In an optional embodiment, referring to FIG. 10, the container management apparatus 900 further includes:

a generation module 940, configured to generate a second container image based on the first container, where the second container image includes at least one of information about the first user, an application, and a driver;

an adding module 950, configured to add an identifier of the second container image to the container image information database of the first user; and an uploading module 960, configured to upload the second container image to the private container image repository of the first user.

It should be understood that the container management apparatus 900 in the embodiments of the present application may be implemented by using an application-specific integrated circuit (ASIC), or a programmable logic device (PLD). The PLD may be a complex programmable logic device (CPLD), a field-programmable gate array (FPGA), a generic array logic (GAL), or any combination thereof. When the container management method shown in FIG. 4 or FIG. 5 is implemented by using software, the apparatus and the modules of the apparatus may also be software modules.

The container management apparatus 900 according to the embodiments of the present application may correspondingly perform the method described in the embodiments of the present application, and the foregoing and other operations and/or functions of the units in the container management apparatus 900 are separately used to implement corresponding procedures performed by the container engine in the method in FIG. 4 or FIG. 5. For brevity, details are not described herein.

In the present application, a container image information database corresponding to an identifier of a user is queried. After an identifier of a container image is found from the container image information database of the user, the container image is obtained based on the identifier of the container image, and a container is further provisioned based on the container image. In a container provisioning process, the container image information database of the user is queried, but a container image information database of another user is not queried. In this case, a container image of the another user is not obtained. This implements user-level isolation of user data in the container provisioning process, and ensures security of the user data.

In addition, the container of the user is converted into the container image, and the identifier of the container image is added to the container image information database of the user. In this case, the container image information database of the user includes the identifier of the container image of the user. This implements the user-level isolation of the user data and ensures the security of the user data.

Figure 11:
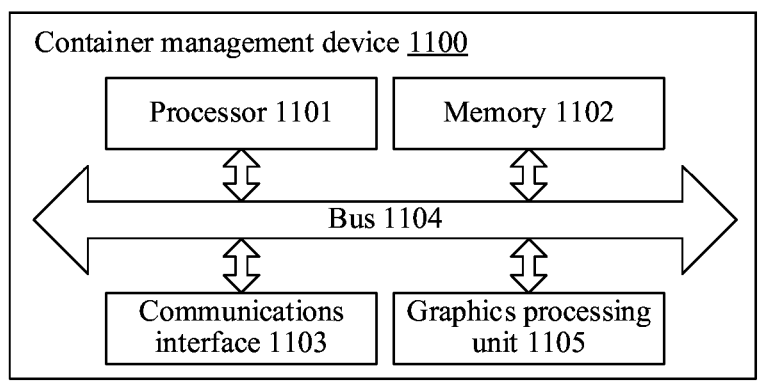
FIG. 11 is a structural block diagram of a container management device according to an embodiment of the present application.

FIG. 11 is a schematic structural diagram of a container management device according to an embodiment of the present application. The device may be a server or a terminal. As shown in FIG. 11, the container management device 1100 includes a processor 1101, a memory 1102, a communications interface 1103, a bus 1104, and a graphics processing unit 1105. The processor 1101, the memory 1102, the communications interface 1103, and the graphics processing unit 1105 communicate with each other by using the bus 1104, or may communicate with each other in another manner such as wireless transmission. The memory 1102 is configured to store an instruction, and the processor 1101 is configured to execute the instruction stored in the memory 1102. The memory 1102 stores program code, and the processor 1101 may invoke the program code stored in the memory 1102 to perform the following operations:

obtaining a container provisioning request, where the container provisioning request carries an identifier of a first user and an identifier of a first container image;

querying a container image information database corresponding to the identifier of the first user, where the container image information database is used to store a mapping relationship between the identifier of the first user and the first container image; and when the identifier of the first container image exists in the container image information database, obtaining the first container image based on the identifier of the first container image, and provisioning a first container based on the first container image.

It should be understood that in this embodiment of the present application, the processor 1101 may be a CPU, or the processor 1101 may be another general-purpose processor, a digital signal processor (DSP), an application-specific integrated circuit (ASIC), a field-programmable gate array (FPGA), or another programmable logic device, discrete gate or transistor logic device, discrete hardware component, or the like. The general-purpose processor may be a microprocessor, any conventional processor, or the like. It should be noted that the processor 1101 may be a processor supporting an ARM architecture.

The memory 1102 may include a read-only memory and a random access memory, and provide an instruction and data for the processor 1101. The memory 1102 may further include a nonvolatile random access memory. For example, the memory 1102 may further store information of a device type.

The memory 1102 may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

The bus 1104 may include a power bus, a control bus, a status signal bus, and the like, in addition to a data bus. However, for clear description, various types of buses in the figure are marked as the bus 1104.

It should be understood that the container management device 1100 according to this embodiment of the present application may correspond to the container management apparatus 900 shown in FIG. 9 or FIG. 10 in the embodiment of the present application, and may correspond to operation steps in which the container engine for performing the method shown in FIG. 4 or FIG. 5 in the embodiment of the present application is an execution body. In addition, the foregoing and other operations and/or functions of the modules in the container engine are separately used to implement corresponding procedures of the method in FIG. 4 or FIG. 5. For brevity, details are not described herein.

An embodiment of the present application further provides a non-transitory computer-readable storage medium. When an instruction in the storage medium is executed by a processor of a computing system, the computing system is enabled to perform the container management method provided in any one of FIG. 4, FIG. 5, FIG. 7A and FIG. 7B, or FIG. 8.

A computer program product including an instruction is provided. When the computer program product runs on a computer, the computer is enabled to execute the instruction for performing the container management method provided in any one of FIG. 4, FIG. 5, FIG. 7A and FIG. 7B, or FIG. 8.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer instructions are loaded and executed on an apparatus, the procedures or functions according to the embodiments of the present application are all or partially generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by an apparatus, or a data storage device, such as a server or a data center, integrating one or more usable media. The usable medium may be magnetic media (for example, a floppy disk, a hard disk, and a magnetic tape), an optical medium (for example, a digital video disk (DVD)), semiconductor medium (for example, a solid-state drive), or the like.

The sequence numbers of the foregoing embodiments of the present application are merely for illustrative purposes, and are not intended to indicate priorities of the embodiments.

The foregoing descriptions are merely optional embodiments of this application, but are not intended to limit this application. Any modification, equivalent replacement, or improvement made without departing from the principle of this application should fall within the protection scope of this application.

What is claimed is:

1. A method, comprising:
obtaining, by a container engine, a container provisioning request, wherein the container provisioning request carries an identifier of a first user and an identifier of a first container image;
querying, by the container engine, a container image information database corresponding to the identifier of the first user, wherein the container image information database stores a mapping relationship between the identifier of the first user and one or more container images, the one or more container images being read-only, and wherein the container image information database comprises one or more identifiers of the one or more container images associated with the identifier of the first user; and when the identifier of the first container image exists in the container image information database:
  obtaining, by the container engine, the first container image based on the identifier of the first container image; and
  provisioning, by the container engine, a first container based on the first container image.

2. The method according to claim 1, wherein the method further comprises:
before the obtaining the container provisioning request:
  registering and creating, based on the identifier of the first user, the container image information database corresponding to the identifier of the first user.

3. The method according to claim 1, wherein the obtaining the first container image comprises:
  obtaining information about the first container image based on the identifier of the first container image; and
  obtaining the first container image from local storage space based on the information about the first container image, and wherein the provisioning the first container comprises:
  starting the first container based on the first container image.

4. The method according to claim 1, wherein the method further comprises:
when the identifier of the first container image does not exist in the container image information database and an attribute of the first container image is private, obtaining the first container image from a private container image repository of the first user.

5. The method according to claim 1, wherein the method further comprises:
when the identifier of the first container image does not exist in the container image information database and an attribute of the first container image is public, obtaining the first container image from a public container image repository.

6. The method according to claim 5, wherein the method further comprises:
after the obtaining the first container image and the provisioning the first container:
  generating a second container image based on the first container, wherein the second container image comprises at least one of information about the first user, an application of the first user, or a driver of the first user;
  adding an identifier of the second container image to the container image information database of the first user; and
  uploading the second container image to a private container image repository of the first user.

7. The method according to claim 1, wherein the querying the container image information database comprises:
  obtaining an authentication result based on the identifier of the first user; and
  when the authentication result is successful, querying the container image information database corresponding to the identifier of the first user.

8. A container management device, comprising:
at least one processor; and
a memory, the memory stores at least one instruction, and the at least one processor loads and executes the at least one instruction to perform operations, the operations including:
  obtaining a container provisioning request, wherein the container provisioning request carries an identifier of a first user and an identifier of a first container image;
  querying a container image information database corresponding to the identifier of the first user, wherein the container image information database stores a mapping relationship between the identifier of the first user and one or more container images, the one or more container images being read-only, and wherein the container image information database comprises one or more identifiers of the one or more container images associated with the identifier of the first user; and
  when the identifier of the first container image exists in the container image information database:
    obtaining the first container image based on the identifier of the first container image; and
    provisioning a first container based on the first container image.

9. The container management device of claim 8, wherein the operations further include:
before the obtaining the container provisioning request:
  registering and creating, based on the identifier of the first user, the container image information database corresponding to the identifier of the first user.

10. The container management device of claim 8, wherein the obtaining the first container image based on the identifier of the first container image comprises:
  obtaining information about the first container image based on the identifier of the first container image; and
  obtaining the first container image from local storage space based on the information about the first container image, and wherein the provisioning the first container comprises:
  starting the first container based on the first container image.

11. The container management device of claim 8, wherein the operations further include:
when the identifier of the first container image does not exist in the container image information database and an attribute of the first container image is private, obtaining the first container image from a private container image repository of the first user.

12. The container management device of claim 8, wherein the operations further include:
when the identifier of the first container image does not exist in the container image information database and an attribute of the first container image is public, obtaining the first container image from a public container image repository.

13. The container management device of claim 12, wherein the operations further include:
after the obtaining the first container image and the provisioning the first container:
  generating a second container image based on the first container, wherein the second container image comprises at least one of information about the first user, an application of the first user, or a driver of the first user;
  adding an identifier of the second container image to the container image information database of the first user; and
  uploading the second container image to a private container image repository of the first user.

14. The container management device of claim 8, wherein the querying the container image information database comprises:
  obtaining an authentication result based on the identifier of the first user; and when the authentication result is successful, querying the container image information database corresponding to the identifier of the first user.

15. A non-transitory computer-readable storage medium comprising instructions which, when executed by a computer, cause the computer to perform operations, the operations comprising:
   obtaining a container provisioning request, wherein the container provisioning request carries an identifier of a first user and an identifier of a first container image;
   querying a container image information database corresponding to the identifier of the first user, wherein the container image information database stores a mapping relationship between the identifier of the first user and one or more container images, the one or more container images being read-only, and wherein the container image information database comprises one or more identifiers of the one or more container images associated with the identifier of the first user; and
   when the identifier of the first container image exists in the container image information database:
      obtaining the first container image based on the identifier of the first container image; and
      provisioning a first container based on the first container image.

16. The non-transitory computer-readable storage medium of claim 15, the operations further comprising:
   before the obtaining the container provisioning request:
      registering and creating, based on the identifier of the first user, the container image information database corresponding to the identifier of the first user.

17. The non-transitory computer-readable storage medium of claim 15, wherein the obtaining the first container image comprises:
   obtaining information about the first container image based on the identifier of the first container image; and
   obtaining the first container image from local storage space based on the information about the first container image, and wherein the provisioning the first container comprises:
      starting the first container based on the first container image.

18. The non-transitory computer-readable storage medium of claim 15, the operations further comprising:
   when the identifier of the first container image does not exist in the container image information database and an attribute of the first container image is private, obtaining the first container image from a private container image repository of the first user.

19. The non-transitory computer-readable storage medium of claim 15, the operations further comprising:
   when the identifier of the first container image does not exist in the container image information database and an attribute of the first container image is public, obtaining the first container image from a public container image repository.

20. The non-transitory computer-readable storage medium of claim 19, the operations further comprising:
   after the obtaining the first container image and the provisioning the first container:
      generating a second container image based on the first container, wherein the second container image comprises at least one of information about the first user, an application of the first user, or a driver of the first user;
      adding an identifier of the second container image to the container image information database of the first user; and
      uploading the second container image to a private container image repository of the first user.

\* \* \* \* \*